3,102,128
MIXED ESTERS AND PROCESS FOR THEIR PREPARATION
Karl Hennig and Gustav Lietz, Dusseldorf-Holthausen, and Günter Meinhard, Dusseldorf, Germany, assignors to Dehydag, Deutsche Hydrierwerke G.m.b.H., Dusseldorf, Germany, a corporation of Germany
No Drawing. Filed July 31, 1961, Ser. No. 127,894
Claims priority, application Germany Aug. 8, 1960
5 Claims. (Cl. 167—63)

The invention relates to a novel process for the preparation of mixed esters of a pentaerythrite di-fatty acid ester and a citric acid di-fatty alcohol ester in a 1:1 molar ratio which are excellent emulsifiers for ointment bases. The invention also relates to an improved process for the formation of citric acid di-fatty alcohol esters by effecting the esterification with aqueous citric acid.

The prior art methods for the preparation of the citric acid di-fatty alcohol esters are not satisfactory since part of the citric acid is transformed into the unsaturated acid, aconitic acid, by splitting off water during the extended heating. The aconitic acid forms undesirable resins which interfere with esterification reactions.

By the use of aqueous citric acid for the formation of the citric acid di-fatty alcohol ester, the difficulties of the prior art are overcome. The use of aqueous citric acid is completely contrary to the prior art esterification since the presence of water normally produces a longer reaction action time which would be expected to increase the side reactions.

It is an object of the invention to provide a novel process for the preparation of mixed esters of pentaerythrite-di-fatty acid esters and citric acid di-fatty alcohol esters.

It is a further object of the invention to provide a novel process for the preparation of citric acid di-fatty alcohol esters.

It is another object of the invention to provide improved emulsifiers for ointment bases.

These and other objects of the invention will become obvious from the following detailed description.

The process of the invention comprises reacting a fatty alcohol having from 12 to 30 carbon atoms with aqueous citric acid to form a citric acid di-fatty alcohol ester, reacting the said ester with a pentaerythrite di-fatty acid ester wherein the fatty acid has 12 to 30 carbon atoms to form a mixed ester of the two esters and recovering the latter.

A preferred mode of the process of the invention comprises heating a fatty alcohol having 12 to 30 carbon atoms to a temperature of about 140° to 170° C., preferably 160° C. and under a reduced pressure of the order of about 10 mm. to 50 mm. Hg, preferably about 25 mm. of Hg, adding aqueous citric acid thereto slowly said aqueous citric acid having dispersed therein about 40 to 80 parts of citric acid per 100 parts of water so that the citric acid will react with the alcohol as rapidly as it is added to form citric acid di-fatty alcohol ester, reacting the latter with a pentaerythrite di-fatty acid ester in a 1:1 molar ratio to form a mixed ester of citric acid di-fatty alcohol ester and pentaerythrite di-fatty acid ester and recovering the latter.

The fatty alcohols which are reacted with citric acid are aliphatic alcohols having 12 to 30 carbon atoms. Examples of suitable alcohols are dodecyl alcohol, hexadecyl alcohol, octadecyl alcohol, octadecanediol and Guerbet alcohol ($C_{22}$).

The pentaerythrite di-fatty acid esters wherein the fatty acid has 12 to 30 carbon atoms may be prepared by the usual esterification processes such as the methyl ester of the fatty acid with pentaerythrite. The ester products preferably are light-colored and have an acid number below one. Examples of suitable fatty acids having 12 to 30 carbon atoms are lauric acid, myristic acid, palmitic acid, stearic acid and mixtures of fatty acids such as coconut fatty acids having 12 to 18 carbon atoms.

The mixed esters prepared by the process of the invention are excellent emulsifiers for ointment bases. The ointment bases containing the said mixed esters have a high temperature stability of about 50° C., are able to bind more water in larger proportions, are practically free from odor and are readily perfumed. The ointments are pure white and have a smooth, soft, creamy structure rather than tacky, have a more pleasant applicability, are easily absorbed by the skin and are non-irritating.

In the following example there are illustrated several preferred embodiments to illustrate the invention. However, it is to be understood that the invention is not to be limited to the specific embodiments.

EXAMPLE I

*Step A.—Preparation of Citric Acid Di-Octadecyl Ester*

115 parts by weight of octadecyl alcohol having a hydroxyl number of 206 were heated to 160° C. at a pressure of 25 mm. of Hg. 54 parts by weight of an aqueous suspension containing 44 kg. of citric acid dispersed in 10 kg. of water were added slowly so that the citric acid immediately reacted with the fatty alcohol. The course of the esterification was followed by observing the amount of water of reaction which passed over.

The citric acid di-octadecyl alcohol ester formed was light in color, had an esterification number of 241 and an acid number of 80 to 85. The product was used in step C below.

*Step B.—Preparation of Pentaerythrite Di-Coconut Fatty Acid Ester*

76 parts by weight of pentaerythrite were reacted with 260 parts by weight of the methyl ester of coconut fatty acid having 12 to 18 carbon atoms having a saponification number of 240 and 1 part by weight of sodium methylate which is an esterification catalyst until the acid number dropped below 2. The pentaerythrite di-fatty acid ester formed was treated with 1% by weight of fuller's earth to remove any adhering soap.

*Step C.—Preparation of the Mixed Ester*

140 parts by weight of the citric acid di-octadecyl ester formed in step A and 115 parts by weight of the pentaerythrite di-coconut fatty acid ester formed in step B were esterified in an inert gas atmosphere until the acid number of the reactoin product dropped below one. After the esterification was terminated, the mixed ester was bleached with 0.1% by weight of the mixed ester of 40% hydrogen peroxide. The mixed ester had a wax-yellow color, a saponification number of 224 and a hydroxyl number of 75.

In similar fashion, mixed esters of the following ester pairs were prepared: (1) citric acid-di-lauryl ester and pentaerythrite-di-stearic acid ester; (2) citric acid-di-lauryl ester and pentaerythrite-di-coconut fatty acid ester; (3) citric acid-di-Guerbet alcohol ($C_{22}$) ester and pentaerythrite-di-stearic acid ester; (4) citric acin-di-octadecanediol ester and pentaerythrite-di-coconut fatty acid ester; (5) citric acid-di-octadecanediol ester and pentaerythrite-di-stearic acid ester; (6) citric acid-didodecyl ester and pentaerythrite-di-coconut fatty acid ester.

EXAMPLE II

*Ointment Base Containing Mixed Ester*

12 parts by weight of the mixed ester formed in step C of Example I were added to the following mixture:

| | Parts by weight |
|---|---|
| Vaseline | 35 |
| Decyl ester of oleic acid | 30 |
| Cetyl alcohol | 6 |
| Ozokerite, white, 70–72° C | 5 |
| Hard paraffin, 50–52° C | 5 |
| Paraffin, viscous liquid | 5 |
| Aluminum stearate | 2 |

The resulting mixture was melted on a water bath and the molten mixture was stirred until homogeneous and then cooled. An ointment base with a high water absorption capacity was obtained.

After the addition of a suitable perfume and/or pharmaceutical ingredients, the base may be used as such. It is also possible to add up to three times by weight of water whereby water-in-oil emulsions of various consistencies are obtained. The amount of water added will vary depending upon the particular use.

Various modifications of the process of the invention may be made without departing from the spirit or scope thereof, and it is to be understood that the invention is to be limited only as defined in the appended claims.

We claim:

1. A process for the preparation of mixed esters of a pentaerythrite di-fatty acid ester wherein the fatty acids have 12 to 30 carbon atoms and a citric acid di-fatty alcohol ester wherein the fatty alcohols have 12 to 30 carbon atoms which comprises reacting a fatty alcohol having 12 to 30 carbon atoms with aqueous citric acid to form a citric acid di-fatty alcohol ester, reacting the latter with a pentaerythrite di-fatty acid ester wherein the fatty acids have 12 to 30 carbon atoms in a molar ratio of about 1:1 to form a mixed ester of citric acid di-fatty alcohol ester and pentaerythrite di-fatty acid ester and recovering the latter.

2. The process of claim 1 wherein the reaction is effected at a temperature between 140 to 170° C. at reduced pressures.

3. The process of claim 1 wherein the fatty alcohol is octadecyl alcohol and the fatty acids are a mixture of fatty acids derived from coconut oil.

4. Mixed esters of a pentaerythrite di-fatty acid ester wherein the fatty acids have 12 to 30 carbon atoms and a citric acid di-fatty alcohol ester wherein the fatty alcohols have 12 to 30 carbon atoms produced by reacting a fatty alcohol having 12 to 30 carbon atoms with an aqueous dispersion of 40 to 80 parts of citric acid per 100 parts of water at temperatures between 140 to 170° C. under reduced pressure to form a citric acid and di-fatty alcohol ester and reacting the latter with a pentaerythrite di-fatty acid ester wherein the fatty acids have 12 to 30 carbon atoms in a molar ratio of about 1:1 to form the said mixed esters.

5. An improved ointment base containing as an emulsifier mixed esters of a pentaerythrite di-fatty acid ester wherein the fatty acids have 12 to 30 carbon atoms and a citric acid di-fatty alcohol ester wherein the fatty alcohols have 12 to 30 carbon atoms produced by reacting a fatty alcohol having 12 to 30 carbon atoms with an aqueous dispersion of 40 to 80 parts of citric acid per 100 parts of water at temperatures between 140 to 170° C. under reduced pressure to form a citric acid di-fatty alcohol ester and reacting the latter with a pentaerythrite di-fatty acid ester wherein the fatty acids have 12 to 30 carbon atoms in a molar ratio of about 1:1 to form the said mixed esters.

References Cited in the file of this patent

UNITED STATES PATENTS

| 1,993,736 | Graves et al. | Mar. 12, 1935 |
| 2,122,716 | Graves | July 5, 1938 |
| 3,006,772 | Houben et al. | Oct. 31, 1961 |